(12) United States Patent
Hadinata et al.

(10) Patent No.: US 10,817,877 B2
(45) Date of Patent: Oct. 27, 2020

(54) SELECTIVELY USING DEGREE CONFIDENCE FOR IMAGE VALIDATION TO AUTHORIZE TRANSACTIONS

(71) Applicant: International Business Machines Corporation, Armonk, NY (US)

(72) Inventors: Martinianus Budi Tjahja Hadinata, Brunnen (CH); Charles Steven Lingafelt, Durham, NC (US); John Elbert Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 1286 days.

(21) Appl. No.: 14/020,554

(22) Filed: Sep. 6, 2013

(65) Prior Publication Data

US 2015/0073985 A1  Mar. 12, 2015

(51) Int. Cl.
*G06Q 40/00* (2012.01)
*G06Q 20/40* (2012.01)

(52) U.S. Cl.
CPC .............. *G06Q 20/40145* (2013.01)

(58) Field of Classification Search
USPC ...................................... 705/35–44
See application file for complete search history.

(56) References Cited

U.S. PATENT DOCUMENTS

| | | | |
|---|---|---|---|
| 7,377,427 B2 | 5/2008 | Murata | |
| 7,398,925 B2 | 7/2008 | Tidwell et al. | |
| 7,814,015 B2 | 10/2010 | Benedyk | |
| 2002/0073029 A1 | 6/2002 | Cheaib | |
| 2004/0024709 A1 | 2/2004 | Yu | |
| 2005/0154671 A1 | 7/2005 | Doan et al. | |
| 2008/0294556 A1* | 11/2008 | Anderson | G06Q 20/40 705/44 |
| 2010/0023400 A1 | 1/2010 | Dewitt | |
| 2010/0084462 A1 | 4/2010 | Scipioni et al. | |
| 2012/0114199 A1* | 5/2012 | Panyam | G06K 9/00288 382/118 |
| 2012/0278155 A1 | 11/2012 | Faith | |

(Continued)

OTHER PUBLICATIONS

Automatic 3D Face Verification From Range DAT by AG Pan, Z Wu, Y Pan— . . . On Multimedia and Expo. ICME'03 . . ., 2003—ieeexplore.ieee.org https://ieeexplore.ieee.org/abstract/document/1221266/.*

(Continued)

*Primary Examiner* — Hani M Kazimi
*Assistant Examiner* — Hatem M Ali
(74) *Attorney, Agent, or Firm* — Samuel A. Waldbaum (57) ABSTRACT

An embodiment of the invention provides a method for selectively using degree confidence for image validation to authorize transactions, wherein a request to authorize a transaction is received, the request including a user's name, a photo of the user, and a transaction value. A database is queried with the user's name to identify one or more reference photos of the user; and, the received photo of the user is compared to the reference photo of the user with an analysis engine to generate a confidence value. An authorization threshold is determined with a processor based on the transaction value. The transaction is authorized when the confidence value is equal to and/or greater than the authorization threshold.

17 Claims, 7 Drawing Sheets

(56) References Cited

U.S. PATENT DOCUMENTS

2014/0067479 A1* 3/2014 Stacklin ............. G06Q 30/0206
                                                        705/7.35
2014/0067679 A1* 3/2014 O'Reilly ................. G06F 21/32
                                                        705/44
2014/0363058 A1* 12/2014 Emmett ............... G06K 9/0061
                                                        382/117
2016/0219046 A1* 7/2016 Ballard ............... H04L 63/0861

OTHER PUBLICATIONS

[PDF] Biometric identification by A Jain, L Hong, S Pankanti—Communications of the ACM, 2000—Citeseer https://citeseerx.ist.psu.edu/viewdoc/download?doi=10.1.1.216.7386&rep=rep1&type=pdf.*

3D human face recognition using point signature by CS Chua, F Han, YK Ho— . . . Face and Gesture Recognition (Cat . . . , 2000—ieeexplore.ieee.org; https://ieeexplore.ieee.org/abstract/document/840640/.*

* cited by examiner

SELECTIVELY USING DEGREE CONFIDENCE FOR IMAGE VALIDATION TO AUTHORIZE TRANSACTIONS

BACKGROUND

The present invention is in the field of systems, methods, and computer program products for selectively using degree confidence for image validation to authorize transactions.

Modern economies rely extensively on noncash transactions between business enterprises and consumers. In particular, personal credit cards and debit cards have become ubiquitous. This, in turn, offers unscrupulous individuals the opportunity to "steal" the identity of the credit card holder, and incur charges against the cardholder's account for their own benefit. For example, dishonest employees of the business may keep the impression of the card number and patron signature. Additionally, the card itself may be stolen which gives the thief the account number, cardholder name and a copy of the cardholder's signature.

SUMMARY OF THE INVENTION

An embodiment of the invention provides a method for selectively using degree confidence for image validation to authorize transactions, wherein a request to authorize a transaction is received, the request including a user's name, a photo of the user, and a transaction value. A database is queried with the user's name to identify one or more reference photos of the user; and, the received photo of the user is compared to the reference photo of the user with an analysis engine to generate a confidence value. An authorization threshold is determined with a processor based on the transaction value. The transaction is authorized when the confidence value is equal to and/or greater than the authorization threshold.

In another embodiment of the invention, a system for authorizing a transaction includes a communications module that receives a request to authorize a transaction, the request including a user's name, a photo of the user, and a transaction value. A processor is connected to the communications module, wherein the processor queries a database with the user's name to identify one or more reference photos of the user. The processor also determines an authorization threshold based on the transaction value. An analysis engine is connected to the processor, wherein the analysis engine compares the received photo of the user to the reference photo of the user to generate a confidence value. The analysis engine authorizes the transaction when the confidence value is equal to and/or greater than the authorization threshold.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

Figure 1:
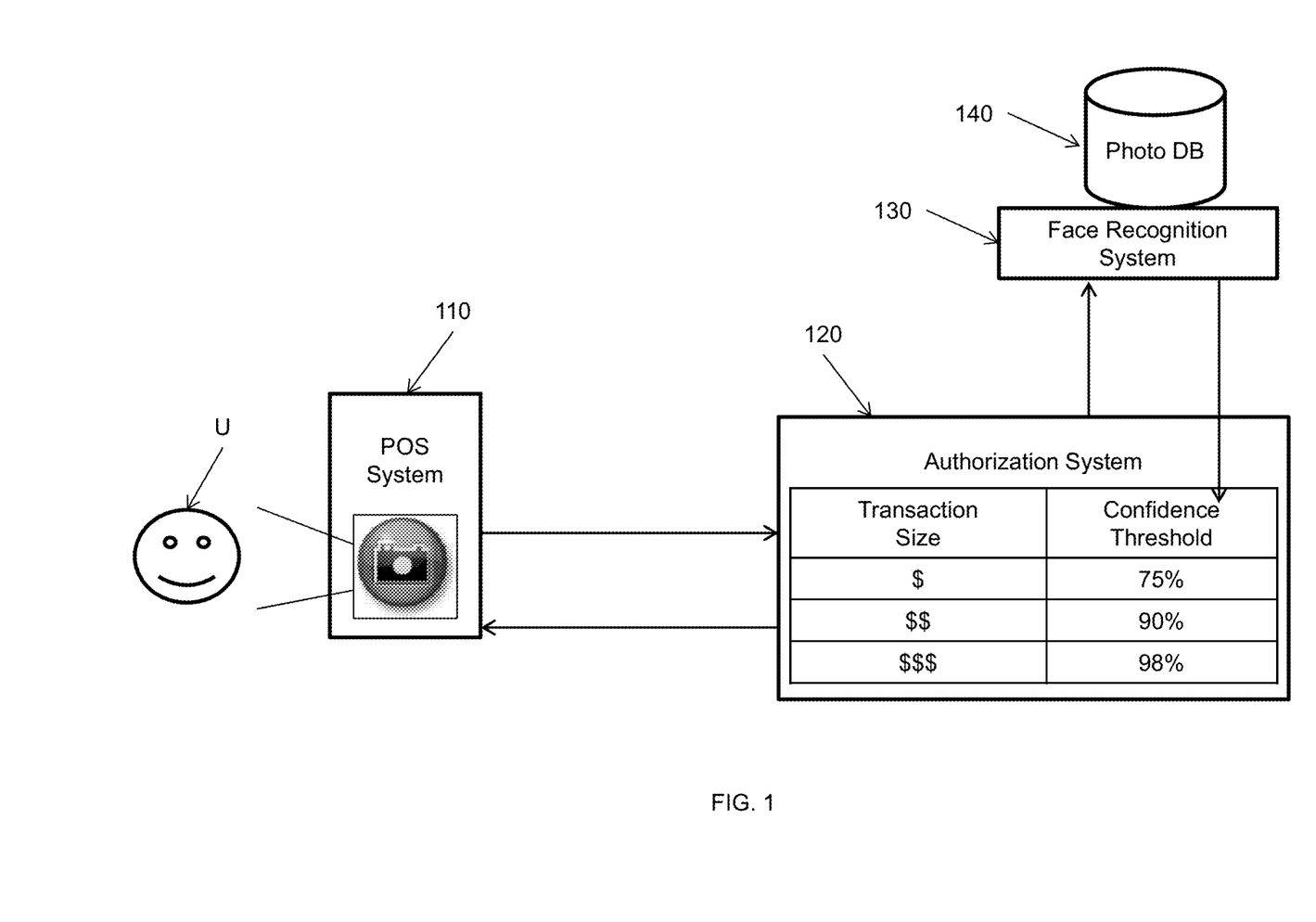
FIG. 1 illustrates a system and method to selectively use degrees of confidence for image validation in order to authorize transactions according to an embodiment of the invention.

FIG. 1 illustrates a system and method to selectively use degrees of confidence for image validation in order to authorize transactions according to an embodiment of the invention. After a user U submits a request to purchase goods and/or services with a credit or debit card, a point of sale (POS) system 110 transmits a validation request to an authorization system (also referred to herein as a "validation system") 120. The validation request can include the amount of the purchase (also referred to herein as the "transaction value"), the identity of the user U, and a photograph of the user U.

The authorization system 120 invokes a face recognition system 130 against one or more photographs in a photograph database 140. The face recognition system 130 determines a confidence level that the photograph taken of the user U is a match to one or more of the reference photographs in the photograph database 140. The authorization system 120 determines if the confidence level received from the face recognition system 130 is greater than a minimum required confidence level for approval of the particular size transaction and sends a response to the POS system 110. Thus, the system's confidence level for recognition can be associated with the transaction size, such that higher-value transactions require a higher confidence level. In at least one embodiment, the components illustrated in FIG. 1 (110, 120, 130, and 140) are co-located within a single device.

At least one embodiment of the invention utilizes a computer system with an integrated camera to take a picture of the person making the credit or debit card purchase, wherein the captured picture is compared, by the merchant, credit card company, financial institution, and/or other registrar system, against a database of pictures previously stored. Facial recognition can be used to determine if the person requesting the purchase is the same as the authorizing purchaser in the database by providing a degree of confidence that the person is a match. With a cheaper purchase (e.g., $5) a lower degree of confidence may be permitted whereas a higher degree of confidence is needed for a more expensive purchase (e.g., $5,000). In at least one embodiment, photo comparison is not performed if the purchase amount is below a predetermined threshold.

Accordingly, the system can take some of the human elements of determining if the person before them making the purchase is the same person authorized to use the credit or debit card. The system can also allow the merchant to set risk thresholds based on the size of the purchase or the type of purchase (e.g., alcohol, prescription medications). In at least one embodiment, the system is used to perform other validation methods, such as the validation of passports, company employee identification cards, etc.

Figure 2:
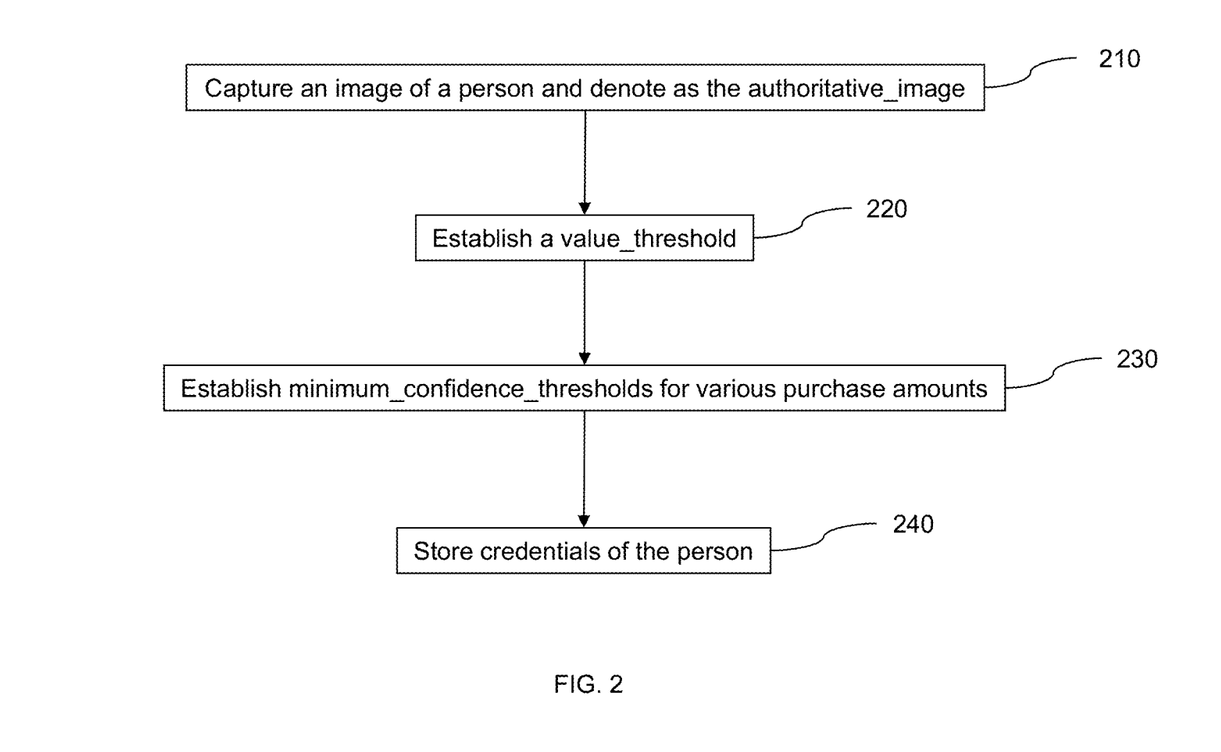
FIG. 2 is a flow diagram illustrating a preparation phase according to an embodiment of the invention.

FIG. 2 is a flow diagram illustrating a preparation phase according to an embodiment of the invention. An image (also referred to herein as a "photo", "photograph", or "picture") of a person (also referred to herein as the "user", "requester", or "purchaser") is taken and denoted as the authoritative_image 210. As used herein, the terms "image", "photograph", "photo", or "picture" includes an image of a face, hand, retina, finger, and/or other physically discernible feature. A value_threshold is established 220. Minimum_confidence_thresholds (also referred to herein as the "authorization thresholds") are also established for various purchase amounts 230. The credentials of the person are stored or made available from other sources 240.

Figure 3:
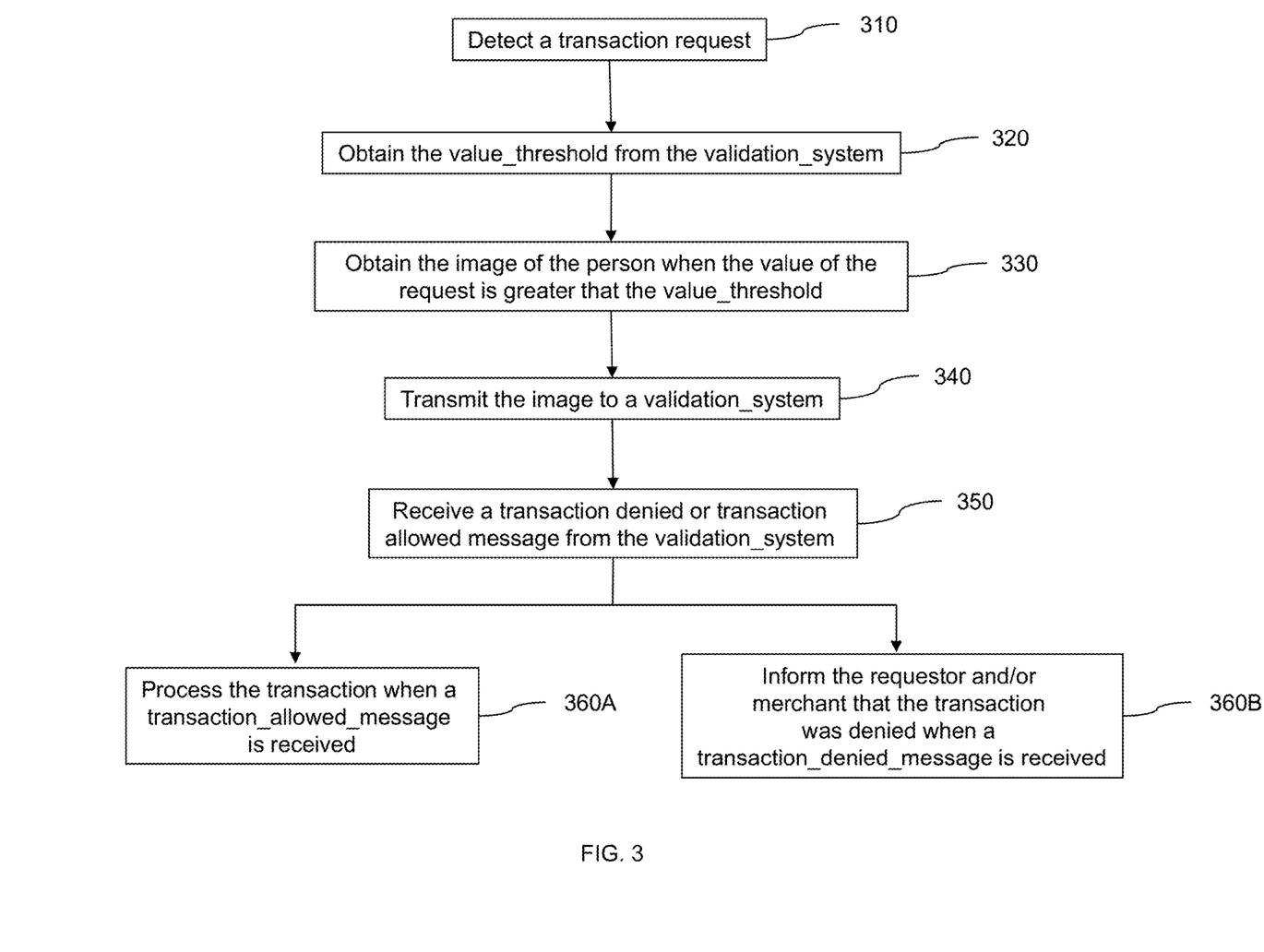
FIG. 3 is a flow diagram illustrating an operational phase of a POS system according to an embodiment of the invention.

FIG. 3 is a flow diagram illustrating an operational phase of a POS system according to an embodiment of the invention. The POS system detects a transaction request 310 and obtains the value_threshold from the validation_system 320. In another embodiment, the value_threshold is stored in memory in the POS system (e.g., cache, RAM, or other storage). As used herein, the term "transaction" can include a purchase of a good, a purchase of a service, and/or the exchange or manipulation of currency or other financial instruments. Thus, in addition to POS systems, the embodiments of the invention could be utilized with automated bank teller systems.

When the value of the request is greater that the value_threshold, then the image of the person is obtained 330. In at least one embodiment, the image is obtained by the POS system, which is under control of the merchant, to prevent the purchaser from submitting a false picture. The image is transmitted to a validation_system 340; and, a transaction denied or transaction allowed message is received from the validation_system 350. When a transaction_allowed_message is received, the transaction is processed 360A. When a transaction_denied_message is received, the requestor and/or merchant is informed that the transaction was denied 360B. In another embodiment, processing of the transaction is halted and/or additional identity credential(s) upon which to make a transaction authorization decision are requested when a transaction_denied_message is received.

Figure 4:
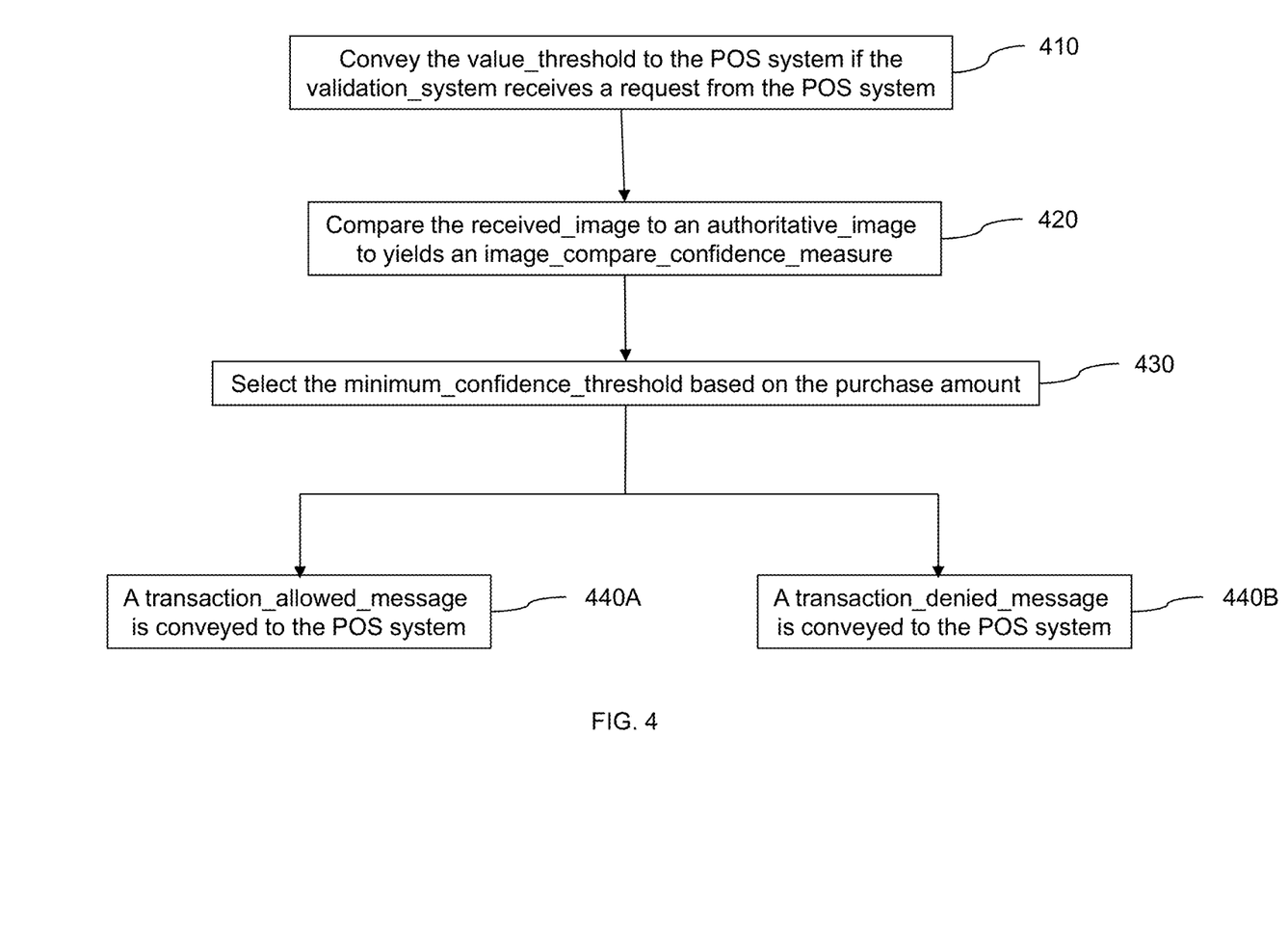
FIG. 4 is a flow diagram illustrating an operational phase of a validation system according to an embodiment of the invention.

FIG. 4 is a flow diagram illustrating an operational phase of a validation system (also referred to herein as an "authorization system") according to an embodiment of the invention. If the validation_system receives a request from the POS system, then the value_threshold is conveyed to the POS system 410. If the validation_system receives an image from the POS system, then the received_image is compared to an authoritative_image, which yields an image_compare_confidence_measure 420.

The minimum_confidence_threshold is selected based on the purchase amount 430. In at least one embodiment, the POS system sends a message to the validation_system indicating the minimum_confidence_threshold to use. If the image_compare_confidence_measure is greater than the minimum_confidence_threshold, then a transaction_allowed_message is conveyed to the POS system 440A. If the image_compare_confidence_measure is less than the minimum_confidence_threshold, then a transaction_denied_message is conveyed to the POS system 440B. In another embodiment, an image of every transaction requester is conveyed to the validation_system; and, the evaluation of whether the transaction_value is greater than the value_threshold is solely performed on the validation_system.

At least one embodiment of the invention includes an operational phase for image improvement, wherein an additional, more recent, and/or improved quality image of the person is stored. An image comparison system can learn from the different images stored to improve accuracy when comparing the received_image to an authoritative_image.

Figure 5:
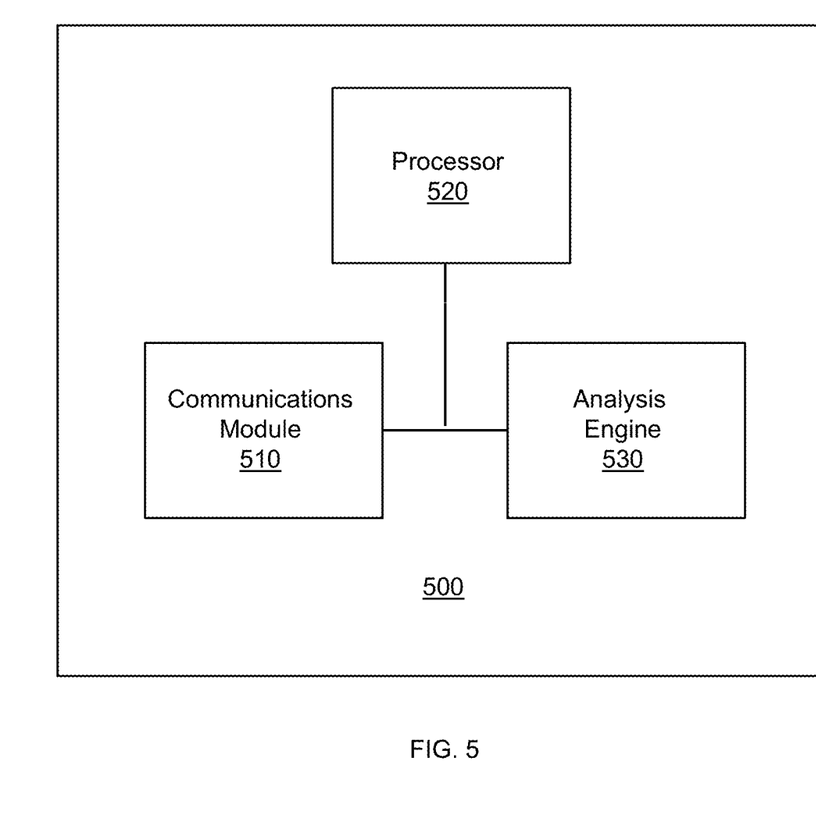
FIG. 5 is a diagram illustrating a system for authorizing a transaction according to an embodiment of the invention.
Figure 6:
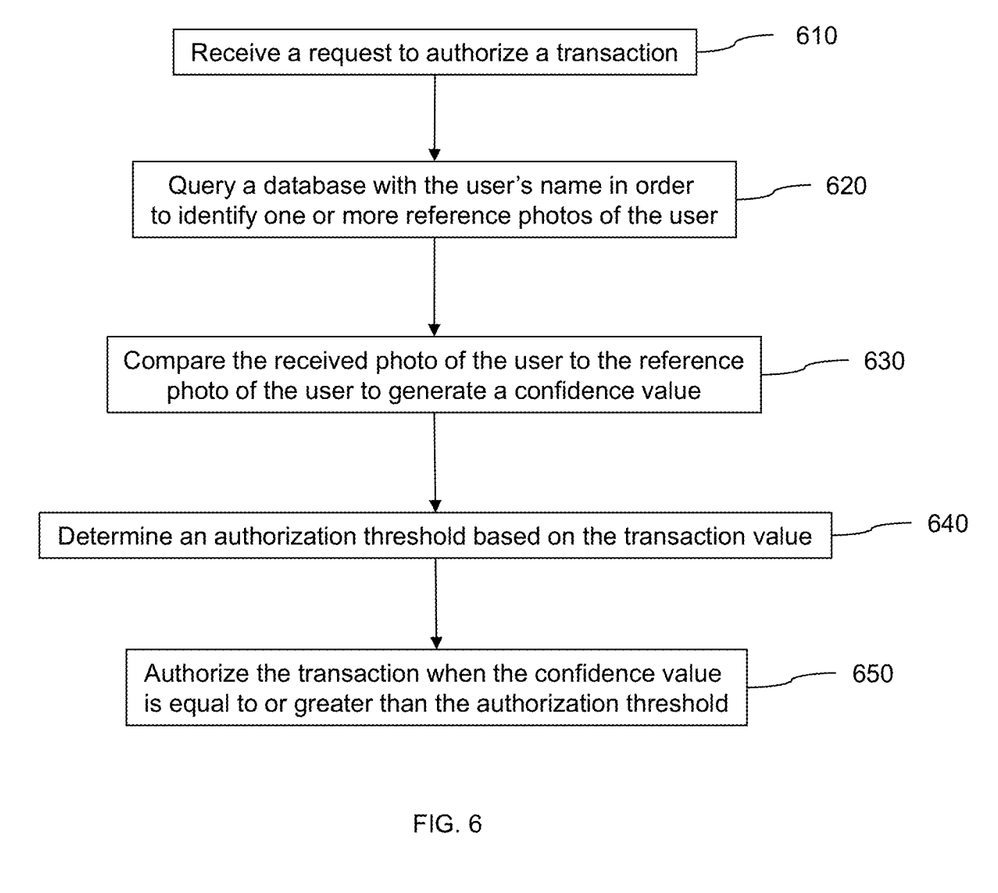
FIG. 6 is a flow diagram illustrating a method for authorizing a transaction according to an embodiment of the invention.

FIG. 5 is a diagram illustrating a system 500 for authorizing a transaction according to an embodiment of the invention, wherein the system 500 includes a communications module 510, a processor 520, and an analysis engine 530. The system 500 is located at the POS system or at a remote location. FIG. 6 is a flow diagram illustrating a method for authorizing a transaction according to an embodiment of the invention, for example, using the system 500. As used herein, the term "transaction" includes a purchase of goods and/or services or a currency withdrawal (e.g., from an automatic teller machine or from a cash register using a debit card). In one embodiment, the transaction is an online purchase conducted electronically over the internet.

The communications module 510 can be a computer hardware device that receives a request to authorize a transaction 610. The request includes a real time photo of the user, the transaction value (i.e., the price of the transaction), and the user's name or other form of identification, such as a credit card number, driver's license number, passport number, company employee identification card, etc. The photo of the user can be generated at the point of sale of the transaction (e.g., at the cash register) by the merchant. The received photo of the user can be a photo of the user's face, hand, retina, and/or fingerprint.

The processor 520 can be a computer hardware device connected to the communications module 510 that queries a database with the user's name in order to identify one or more reference photos of the user 620. As used herein, the term "connected" includes operationally connected, logically connected, in communication with, physically or wirelessly connected, engaged, coupled, contacts, linked, affixed, and attached. The database can be an electronic storage device that is external to or part of the system 500. In at least one embodiment, the database is a social networking website.

The analysis engine 530 (also referred to herein as the "face recognition system") can be a computer hardware device that is connected to the processor 520 that compares the received photo of the user to the reference photo of the user to generate a confidence value 630. The confidence value indicates a degree to which the received photo of the user matches the reference photo of the user. In at least one embodiment, the received photo of the user is compared to two or more reference photos of the user to generate at least two confidence values. The analysis engine 530 can generate an average confidence value for later comparison with an authorization threshold.

In at least one embodiment of the invention, the received photo can be stored in the database when the confidence value is equal to or greater than a storage threshold. Thus, the reference photos can be updated over time. In another embodiment, the received photo can be stored in the database when the confidence value is equal to or less than a second storage threshold. Thus, the received photo and/or requester can be tagged (e.g., as a potential unauthorized user). In at least one embodiment, if the received photo matches (i.e., is above a threshold confidence value) a reference photo for another name, then the transaction is not authorized and/or law enforcement authorities or security personnel are notified.

The processor 520 determining an authorization threshold based on the transaction value 640. The authorization threshold can be higher for higher value transactions and lower for lower value transactions. Thus, the authorization threshold is set based on the cost of the transaction. In at least one embodiment, the processor 520 determines that the authorization threshold is a first authorization threshold for a lower transaction value, a second authorization threshold for a middle transaction value, or a third authorization threshold for a higher transaction value. In this embodiment, the first authorization threshold is lower than the second authorization threshold; and, the third authorization threshold is higher than the second authorization threshold. For example, the first authorization threshold is between 70-75%, the second authorization threshold is between 76-90%, and the third authorization threshold is between 91-100%. The analysis engine 530 authorizes the transaction when the confidence value (or average confidence value) is equal to or greater than the authorization threshold 650.

In at least one embodiment of the invention, the request to authorize a transaction further includes the type of purchase, wherein the authorization threshold is based on the type of purchase. The type of purchase can include commodities whose sales are restricted to certain authorized individuals by reason of a verifiably individual attribute. The commodities can include a purchase based on the age of the individual, such as an alcohol or tobacco purchase, or a purchase based on the rights of the individual, such as a prescription script required pharmaceutical purchase. Thus, a greater identity match can be required for particular types of purchases. In another embodiment, if the transaction value is above a predetermined threshold, then addition security measures are performed, such as, for example, obtaining a fingerprint and/or additional identification from the customer.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
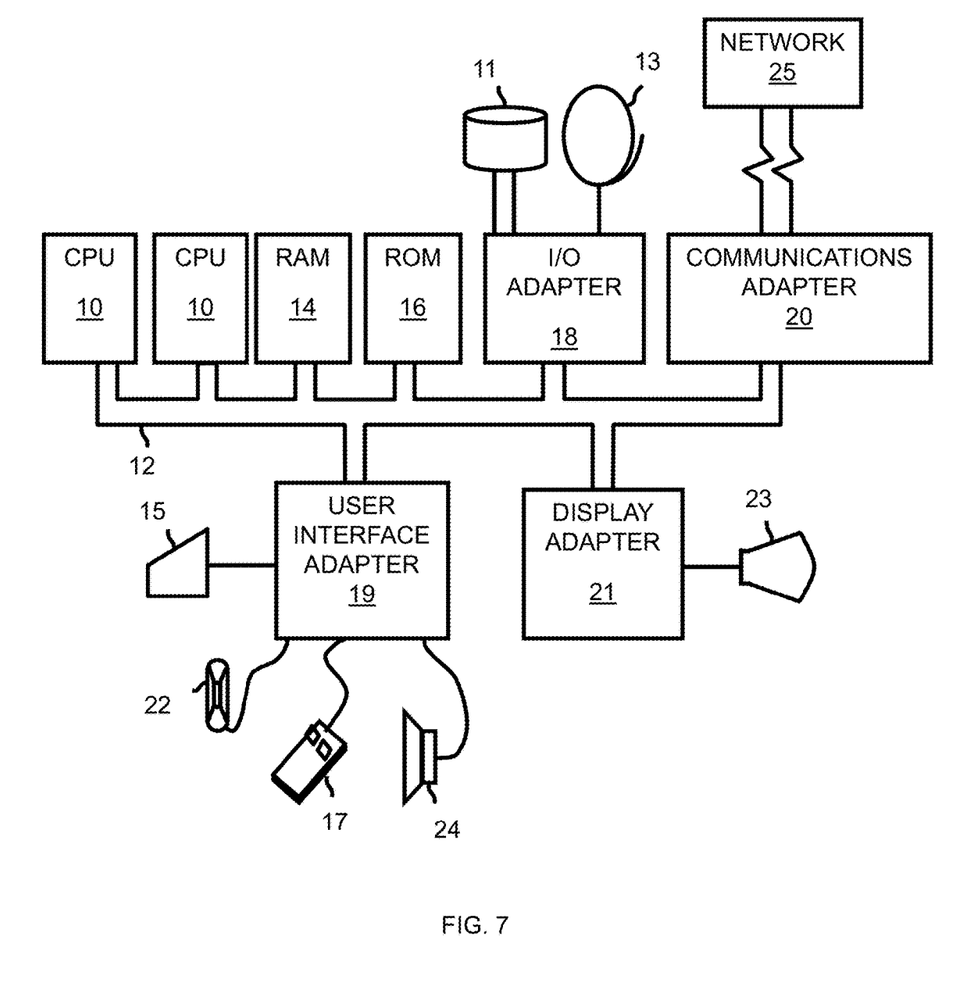
FIG. 7 illustrates a computer program product according to an embodiment of the invention.

Referring now to FIG. 7, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for authorizing a transaction, said method comprising:
    receiving a request by a point of sale system having an integrated camera to authorize a transaction, the request comprising a user's name, a photo of the user captured by the integrated camera, a transaction value, and a type of purchase;
    querying a database with the user's name to identify at least one reference photo of the user;
    comparing the received photo of the user to the reference photo of the user with a face recognition system to generate a confidence value that indicates a degree to which the received photo matches the reference photo;
    tagging and storing the received photo in the database when the confidence value is at least one of equal to or less than a first storage threshold indicating a potential unauthorized user, and determining whether the tagged photo matches a stored photo of a user with another name and providing an alert when the received tagged photo matches a stored photo of a user with another name;
    determining an authorization threshold with an authorization system based on the transaction value and the type of purchase;
    authorizing the transaction when the confidence value is at least one of equal to or greater than the authorization threshold, and greater than the first storage threshold,
    wherein the point of sale system, the authorization system, the face recognition system, and the database are co-located in a single device.

2. The method according to claim 1, wherein the photo of the user is captured at a point of sale of the transaction by a merchant.

3. The method according to claim 2, wherein the received photo is captured at a cash register of a merchant.

4. The method according to claim 1, wherein the authorization threshold comprises:
    a first authorization threshold for a lower transaction value;
    a second authorization threshold for a middle transaction value; and
    a third authorization threshold for a higher transaction value,
    wherein the first authorization threshold is lower than the second authorization threshold, and
    wherein the third authorization threshold is higher than the second authorization threshold.

5. The method according to claim 1, wherein the type of purchase includes at least one of goods or services whose sales are restricted to authorized individuals based on a verifiable attribute.

6. The method according to claim 1, further comprising storing the received photo in the database when the confidence value is at least one of equal to or greater than a second storage threshold.

7. The method according to claim 1, wherein said comparing of the received photo of the user comprises:
    comparing the received photo of the user to at least two reference photos of the user to generate at least two confidence values; and
    generating an average confidence value for comparison with the authorization threshold.

8. The method according to claim 1, wherein the type of purchase includes a purchase that is restricted based on age of the purchaser.

9. The method according to claim 1, wherein the type of purchase includes a prescription pharmaceutical purchase.

10. The method according to claim 1, wherein the request further comprises a form of identification selected from the group consisting of a driver's license number, passport number, and employee identification card.

11. The method according to claim 1, wherein the authorization threshold is received from a merchant at a location of the point of sale system.

12. A system for authorizing a transaction, said system comprising:
    a communications module, said communications module receives a request from a point of sale system having an integrated camera to authorize a transaction, the request comprising a user's name, a photo of the user captured by the integrated camera, a transaction value, and a type of purchase;
    a processor connected to said communications module, said processor queries a database with the user's name to identify at least one reference photo of the user, said processor determines an authorization threshold based on the transaction value and the type of purchase;
    an analysis engine connected to said processor, said analysis engine compares the received photo of the user to the reference photo of the user to generate a confidence value that indicates a degree to which the received photo matches the reference photo, said analysis engine tags and stores the received photo in the database when the confidence value is at least one of equal to or less than a first storage threshold indicating a potential unauthorized user, said analysis engine determines whether the tagged photo matches a stored photo of a user with another name and provides an alert when the received tagged photo matches a stored photo of a user with another name, said analysis engine authorizes the transaction when the confidence value is one of equal to or greater than the authorization threshold and is greater than the first storage threshold,
    wherein the communications module, the processor, and the analysis engine are located at the point of sale system.

13. The system according to claim 12, wherein the authorization threshold comprises:
    a first authorization threshold for a lower transaction value;
    a second authorization threshold for a middle transaction value; and
    a third authorization threshold for a higher transaction value,
    wherein the first authorization threshold is lower than the second authorization threshold, and
    wherein the third authorization threshold is higher than the second authorization threshold.

14. The system according to claim 12, wherein the type of purchase includes at least one of goods or services whose sales are restricted to authorized individuals based on a verifiable attribute.

15. The system according to claim 12, wherein said processor stores the received photo in the database when the confidence value is one of equal to or greater than a second storage threshold.

16. The system according to claim 12, wherein
    said analysis engine compares the received photo of the user to at least two reference photos of the user to generate at least two confidence values, and
    said analysis engine generates an average confidence value for comparison with the authorization threshold.

17. A non-transitory computer-readable medium storing computer-readable instructions thereon which when executed by a computer processor cause the computer processor to perform a method comprising:
    receiving a request by a point of sale system having an integrated camera to authorize a transaction, the request comprising a user's name, a photo of the user captured by the integrated camera, a transaction value, and a type of purchase;
    querying a database with the user's name to identify at least one reference photo of the user;
    comparing the received photo of the user to the reference photo of the user to generate a confidence value, the confidence value indicating a degree to which the received photo of the user matches the reference photo of the user;
    tagging and storing the received photo in the database when the confidence value is at least one of equal to or less than a first storage threshold indicating a potential unauthorized user, and determining whether the tagged photo matches a stored photo of a user with another name and provide an alert when the received tagged photo matches a stored photo of a user with another name;
    determining an authorization threshold based on the transaction value and the type of purchase; and
    authorizing the transaction when the confidence value is one of equal to or greater than the authorization threshold and greater than the first storage threshold.

* * * * *